(12) United States Patent
Geary et al.

(10) Patent No.: US 7,431,547 B2
(45) Date of Patent: Oct. 7, 2008

(54) CORNER RESTRAINT FOR SECURING ARTICLES ON A SHIPPING AND/OR STORAGE RACK

(75) Inventors: James R. Geary, Cochranton, PA (US); George L. Noey, Harmonsburg, PA (US); Darrell K. Jewell, Portersville, PA (US); Timothy R. Leone, Meadville, PA (US); George J. McElhinny, Cambridge Springs, PA (US); Aleksandr S. Sobkin, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 187 days.

(21) Appl. No.: 11/131,984

(22) Filed: May 18, 2005

(65) Prior Publication Data
US 2005/0260403 A1    Nov. 24, 2005

Related U.S. Application Data

(63) Continuation-in-part of application No. 09/955,777, filed on Sep. 19, 2001, now Pat. No. 6,899,946.

(60) Provisional application No. 60/237,887, filed on Oct. 4, 2000.

(51) Int. Cl.
*B60P 7/08* (2006.01)

(52) U.S. Cl. ............................ 410/41; 410/35; 410/99; 410/155

(58) Field of Classification Search .................. 410/34, 410/35, 41, 99, 155; 206/453, 586; 248/345.1
See application file for complete search history.

(56) References Cited

U.S. PATENT DOCUMENTS

| | | | |
|---|---|---|---|
| 4,014,435 A | | 3/1977 | Rowley et al. |
| 4,877,673 A | * | 10/1989 | Eckel et al. |
| 5,030,592 A | | 7/1991 | Komarneni et al. |
| 5,240,886 A | | 8/1993 | Gulotta et al. |
| 5,364,685 A | | 11/1994 | Nakashima et al. |
| 5,523,162 A | | 6/1996 | Franz et al. |
| 5,593,929 A | | 1/1997 | Krumwiede et al. |
| 5,878,548 A | | 3/1999 | Sauer et al. |
| 6,027,766 A | | 2/2000 | Greenberg et al. |
| 6,899,946 B2 | * | 5/2005 | Geary et al. |
| 2002/0094429 A1 | | 7/2002 | Geary et al. |
| 2003/0111383 A1 | * | 6/2003 | Qiu et al. |

FOREIGN PATENT DOCUMENTS

| | | |
|---|---|---|
| DE | 296 14 886 | 11/1996 |
| NL | 7 709 052 | 8/1978 |
| WO | 02/053474 A1 | 7/2002 |

* cited by examiner

*Primary Examiner*—Stephen Gordon
(74) *Attorney, Agent, or Firm*—Andrew C. Siminerio (57) ABSTRACT

A restraint, e.g. a corner restraint for packaging flat glass sheets, includes a first leg and a second leg joined at a vertex. Each of the legs have an outer surface having a first strap engaging position spaced from the vertex and a second strap engaging position at the vertex. The height of the first strap engaging position measure from an intermediate portion of the second surface between the first and second positions is greater than the height of the second strap engaging position. With this arrangement, the biasing force applied by a banding strap to the corner restraint reduces the biasing force applied to the vertex to reduce damage to corners of the flat glass sheets.

25 Claims, 6 Drawing Sheets

CORNER RESTRAINT FOR SECURING ARTICLES ON A SHIPPING AND/OR STORAGE RACK

CROSS-REFERENCE TO RELATED APPLICATION

This application is a continuation-in-part of U.S. patent application Ser. No. 09/955,777 filed on Sep. 19, 2001, in the names of James R. Geary et al., entitled REUSABLE RESTRAINT FOR SECURING ARTICLES FOR SHIPPING AND/OR STORAGE, now U.S. Pat. No. 6,899,946 B2. This application claims the benefits of U.S. Provisional Application Ser. No. 60/237,887 filed Oct. 4, 2000. U.S. patent application Ser. No. 09/955,777 and U.S. Provisional Application Ser. No. 60/237,887 in their entirety are incorporated herein by reference.

BACKGROUND OF THE INVENTION

1. Field of the Invention

This invention relates to a restraint, e.g. a corner or edge restraint for securing, and a method of using a restraint, e.g. a corner or edge restraint to secure articles, e.g. sheets in a container, e.g. a shipping and/or storage rack, and more particularly, to a corner restraint have outer surface contour, and method of applying forces to the corner of packed sheets, e.g. glass sheets, to apply basing forces to the corner restraint at a position spaced from the vertex or corner of the restraint.

2. Technical Considerations

Frangible and non-frangible articles, such as flat glass sheets, automotive transparencies, architectural glass articles, wood or metal sheets, and the like, are typically shipped in bulk to fabricators in racks. However, as is appreciated by those skilled in the art, other types of containers, e.g. bins and flatbed railcars having vertical stanchions are also used. The individual glass sheets are secured in the racks to prevent or minimize transportation forces from moving or jostling the sheets during shipping. As is further appreciated by those skilled in the art, the moving of the glass sheets can damage the sheets, e.g. scratch the surfaces of adjacent sheets and/or fracture the edges of the sheets.

In one commonly used method for shipping glass sheets, the edges of individual glass sheets are supported on the base of a rack with the sheets maintained in a generally vertical position by a sloped supporting surface of a backwall mounted to the base. In one arrangement, the sheets are secured on the rack as a unitized pack by plastic or steel banding straps and corner or edge restraints (also referred to as lash bars). An example of one such system is described in U.S. Pat. No. 4,014,435. Although the use of corner restraints and banding straps to unitize packed individual glass sheets is acceptable, the presently available corner restraints have limitations. More particularly, in one arrangement, a banding strap has its course around the backwall of the rack, and around the glass sheets loaded or packed on the rack. The banding strap engages the corner restraints at each of the corners of the packed sheets farthermost from the backwall, i.e. the front corners of the packed glass sheets.

In general, the corner restraints have a pair of legs set at a 90 degrees angle to one another with one of the legs of the corner restraint contacting a side of the packed glass sheets, and the other leg of the corner restraint contacting outer surface portion of the packed glass sheets. In those instances when the corner of the packed glass sheets is at an angle of less than 90 degrees and the pair of legs of the restraint are set at 90 degrees, the corner restraint pivots about the corner of the packed glass sheets. Tightening the banding strap, in both instances discussed above, to unitize the pack of glass sheets biases the corner restraint against the packed sheets applying most of the pressure or force to the corners of the packed glass sheets, which is one of the most susceptible areas for breakage.

As is now appreciated, it would be advantageous to provide a corner or edge restraint that does not have the limitations of the presently available corner restraints, i.e. corner restraints used in combination with banding straps that maintains articles, e.g. individual packed glass sheets, as a unitized pack in a rack while reducing the forces applied to the corners of the packed glass sheets.

SUMMARY OF THE INVENTION

The invention relates to restraint, e.g. a corner restraint. In one non-limiting embodiment of the invention, the corner restraint includes a body having, among other things, a first surface, and an opposite second surface. The second surface has a first strap engaging position spaced a first predetermined distance from one end of the restraint and a second strap engaging position spaced a second predetermined distance from the one end of the restraint. The first predetermined distance is less than the second predetermined distance, and first strap engaging position has a height measured from a portion of the second surface between the first and second engaging positions, defined as an intermediate position, that is greater than a height of the second engaging position measured from the intermediate position.

In another non-liming embodiment of the invention, the first surface is a compressible, resilient surface, and the opposite second surface is an abrasion-resistant surface.

In still another non-limiting embodiment of the invention the second surface of the body includes a groove extending from the one end of restraint towards an opposing end of the restraint. The first and second strap engaging positions and the intermediate position are in the groove.

In a further non-limiting embodiment of the invention, the body of the restraint is a substantially L-shaped body, having a first leg and a second leg defining a vertex. The one end of the body is an end of the first leg spaced from the vertex and the second predetermined position is at the vertex.

In a still further non-limiting embodiment of the invention, the second leg includes the first surface and the second surface with the second surface of the second leg having a strap engaging position defined as the third strap engaging position spaced from the vertex. The third strap engaging position has a height measured from a portion of the second surface of the second leg between the third engaging position and the vertex, defined as a second intermediate position, that is greater than a height of the vertex measured from the second intermediate position.

Additional non-limiting features of the invention include, but are not limited to (a) the first surface of the first leg and the second leg being an outer surface of a first layer; the second surface of the first and second leg being an outer surface of the second layer, and the first and second layers are laminated together; and (b) a strap retaining arrangement attached to the second layer between the first and third strap engaging positions.

The invention is also directed to the corner restraint to secure sheets on a rack. The rack includes a base and a backwall extending from the base to support the sheets in a generally vertical position with edges of the sheets on the base and major surfaces of the sheets supported by the backwall. A banding strap biases the sheets toward the backwall to provide a load of packed sheets on the rack. The first surface of the restraint engages one corners of the load and a portion of the banding strap passes over the second surface of the restraint to apply a force at least to the first strap engaging position and the vortex of the restraint.

The present invention also provides a restraint, comprising a body comprising a first surface and an opposing second surface; a first strap engaging position on the second surface and spaced a first predetermined distance from one end of the restraint; and a second strap engaging position on the second surface and spaced a second predetermined distance from the one end of the restraint. The first and second strap engaging positions are configured such that a force applied by a banding strap to the second surface of the restraint when the banding strap engages the first and second strap engaging positions is greater along the first surface beneath the first strap engaging position than along the first surface beneath at the second strap engaging position.

In one non-limiting embodiment of the invention, the first surface of the restraint is a compressible, resilient surface, and the opposite second surface of the restraint is an abrasion-resistant surface. The body is a substantially L-shaped body comprising a first leg and a second leg defining a vertex. The one end of the body is an end of the first leg spaced from the vertex and the second predetermined position is at the vertex.

Still further, the invention relates to a method of shipping articles, e.g. flat glass sheets. One non-limiting embodiment of the method includes the steps of placing a plurality of articles on a base of a shipping/storage container such that the articles form a load having at least two opposing corners; placing a restraint having an outer surface at each of the two opposed corners; and placing a banding strap in contact with the outer surface of each of the restraints and selected portions of the container to secure the articles to the container such that the banding engages the outer surface of the restraints at the corners of the load. The course of the banding strap over at least one of the restraints is defined by a decrease in the distance between the load and the banding strap as the banding strap moves from one end of the restraints toward the adjacent corner of the load.

BRIEF DESCRIPTION OF THE DRAWINGS

A complete understanding of the invention will be obtained from the following description when taken in connection with the accompanying drawing figures, wherein like reference characters identify like parts throughout.

DESCRIPTION OF THE PREFERRED EMBODIMENTS

As used herein, spatial or directional terms such as "inner", "outer", "left", "right", "back", "front", and the like, relate to the invention as it is shown in the drawing figures. However, it is to be understood that the invention can assume various alternative orientations and step sequences without departing from the inventive concepts disclosed herein. Accordingly, such terms are not to be considered as limiting unless otherwise indicated. Further, as used herein, all numbers expressing dimensions, quantities of ingredients, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to include the beginning and ending range values and to encompass any and all subranges subsumed therein. For example, a range of "1 to 10" should be considered to specifically include any and all subranges between (and inclusive of) the minimum value of 1 and the maximum value of 10, e.g., 1 to 7.3 or 4.3 to 8.1 or 5.5 to 10. Also, as used herein, the terms "polymer" or "polymeric" include oligomers, homopolymers, and copolymers.

Before discussing non-limiting embodiments of the restraint, e.g. corner or edge restraint, of the invention, it is understood that the invention is not limited in its application to the details of the particular non-limiting embodiments shown and discussed herein since the invention is capable of other embodiments. Further, the terminology used herein to discuss the non-limiting embodiments of the invention is for the purpose of description and is not of limitation.

Non-limiting embodiments of the corner restraint of the invention will be described for securing flat four sided glass sheets on a shipping and/or storage rack, however, as is appreciated by those skilled in the art, the invention is not limited to flat glass sheets having four sides, and the invention contemplates using the corner restraints of the invention to secure glass sheets of any shape, size, type or glass composition on a shipping and/or storage rack. For example and not limited to the invention, the peripheral edges of the sheets can be round or elliptical, the glass sheets can be in the shape of three or more flat and/or curved sides of equal or non-equal length. The glass can be annealed, tempered, heat strengthened, clear and/or tinted soda-lime-silicate glass, borosilicate glass, or any type of refractory glass, for example, of the type disclosed in U.S. Pat. Nos. 5,030,592; 5,240,886; and 5,593,929. Still further, one or both of the major surfaces of the glass sheets can have a coating, e.g. but not limiting to the invention, a self cleaning coating, e.g. of the type disclosed in U.S. Pat. No. 6,027,766 and/or sold by PPG Industries, Inc. under their trademark SunClean; a hydrophobic coating of the type disclosed in U.S. Pat. No. 5,523,162 and/or sold by PPG Industries Inc. under the trademark AQUAPEL; an electrically heatable coating or a solar control coating of the type used in the art, e.g. of the types disclosed in U.S. Pat. No. 5,364,685, which patents are hereby incorporated by reference.

Further and not limiting to the invention, the sheets can be of any material, e.g. and not limiting to the invention, wood, metal, plastic, glass and combinations thereof. The sheets can be monolithic sheets, laminated sheets, two or more sheets spaced by, and joined to, a spacer frame, e.g. multiple glazed units and combinations thereof.

Still further, non-limiting embodiments of the invention contemplate using the corner restraints of the invention with any type of fastening system to secure any type of article, e.g. furniture, household appliances; any type, shape and/or size of filled, partially filled or empty receptacles on any type of shipping and/or storage container, e.g. any type or design of bin, rack or railcar used to ship sheets and/or articles mentioned above and/or contemplated by the invention.

Figures 2, 3:
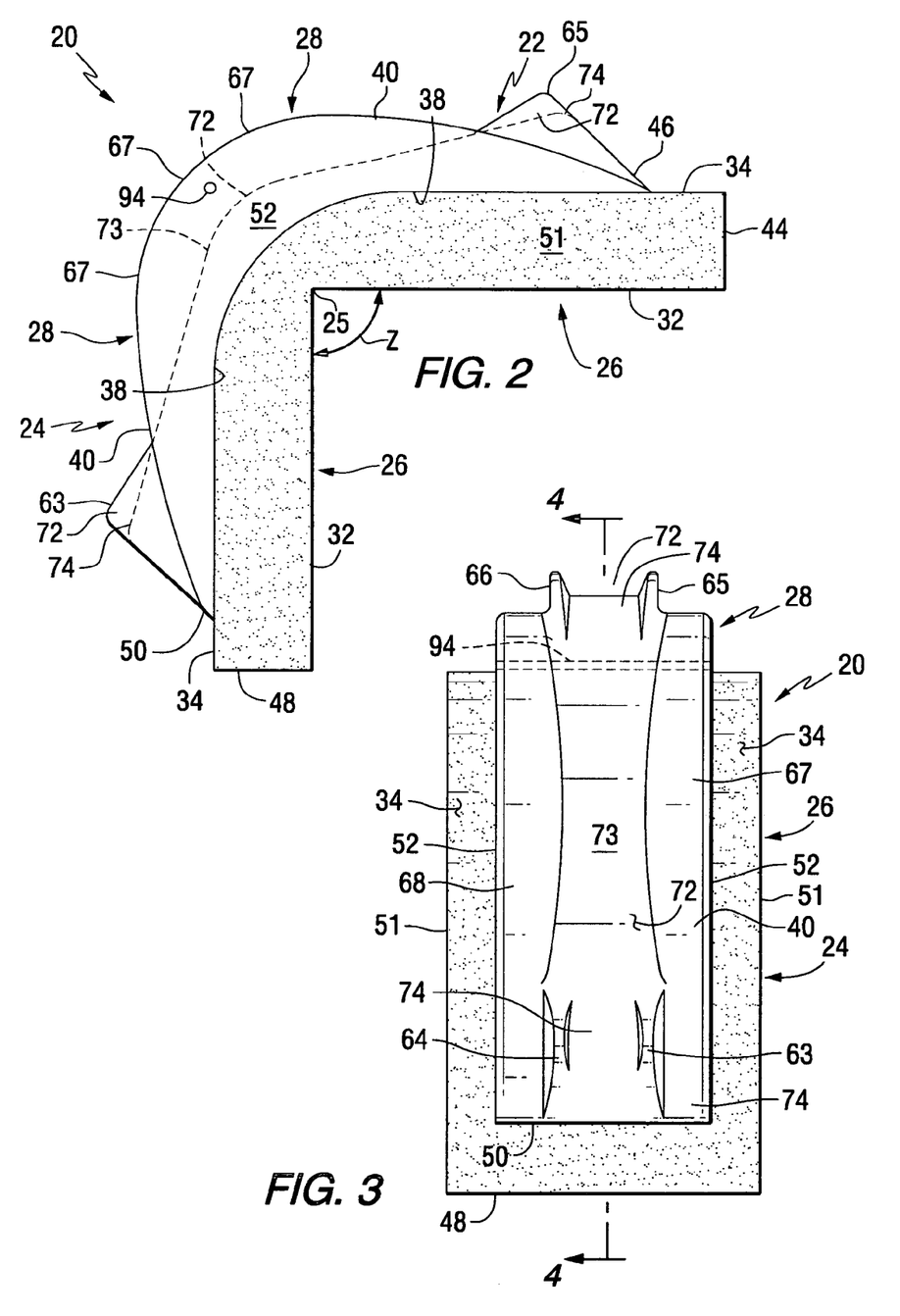
FIG. 2 is a side elevated view of the corner restraint of FIG. 1.
FIG. 3 is an end view of the corner restraint of FIG. 1.
Figure 4:
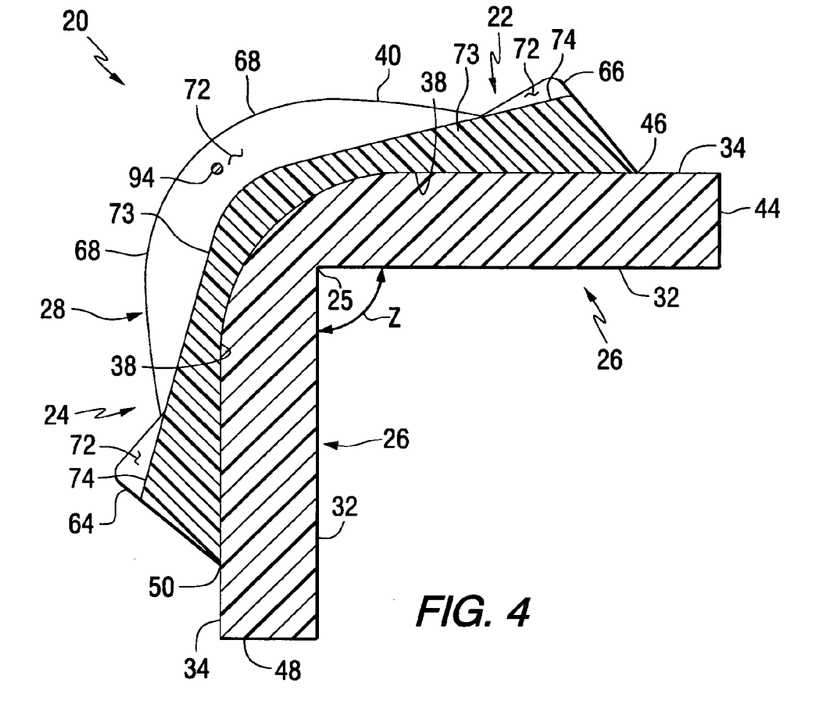
FIG. 4 is a view taken along lines 4-4 of FIG. 3.
Figure 5:
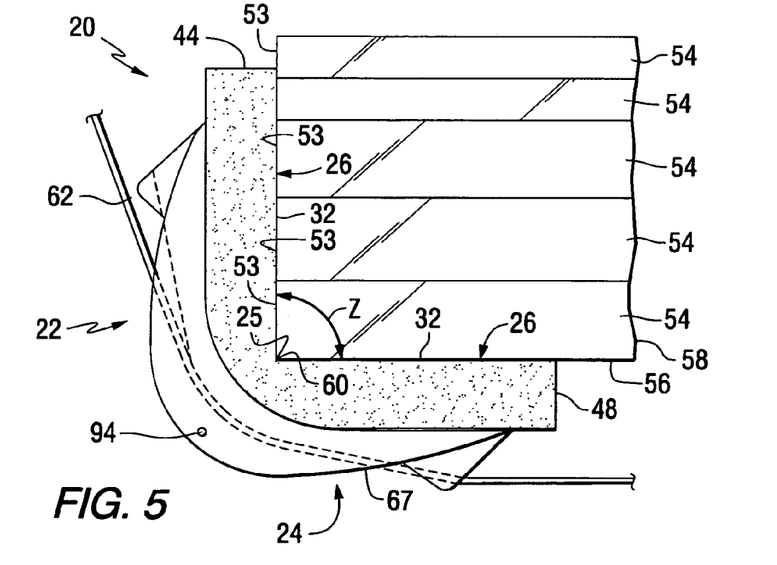
FIG. 5 is a top corner view of packed glass sheets showing a banding strap biasing the corner restraint of FIG. 1 against the corner of packed sheets.

With reference to FIGS. 2 and 4, the portion or region of the outer surface 32 of the first layer 26 between the vertex 25 and the end 44 of the layer 26, and the portion or region of the outer surface 32 of the first layer 26 between the vertex 25 and the end 48 of the first layer 26 define an angle Z centered around the vertex 25. With particular reference to FIG. 5, in one non-limiting embodiment of the invention, the angle Z is substantially equal to the angle subtended by edges 53 of packed glass sheets 54 and outermost surface 56 of outermost glass sheet 58 (outer most sheet designated by the numbers 56 and 58) of the packed sheets 54. In this manner, the vertex 25 engages corner 60 of the packed glass sheets 54 with the region of the first surface 32 of the first layer 26 between the vertex 25 and the end 44 of the first layer 26 engaging the underlying edges 53 of the packed glass sheets 54, and with the region of the first surface 32 of the first layer 26 between the vertex 25 and the end 48 of the first layer engaging the underlying outer surface 56 of the outermost glass sheet 58 of the packed sheets 54. Usually the angle Z is a 90-degree angle, i.e. a right angle, however non-limiting embodiments of the invention contemplate the angle Z to be more or less than a right angle.

In the non-limiting embodiment of the invention shown in FIGS. 1-4, the inner surface 34 of the first layer 26 of the restraint 20 is continuous along the inner surface 38 of the second layer 28 with end 44 of the first layer 26 extending beyond end 46 of the second layer 28, and opposite end 48 of the first layer 26 extending beyond opposite end 50 of the second layer 28. Further, opposite sides 51 of the first layer 26 extend beyond opposite sides 52 of the second layer 28. As is appreciated by those skilled in the art, the ends 44 and 48, and sides 51 of the first layer 26 can terminate short of, or be aligned with, respective one of the ends 46 and 50, and sides 52 of the second layer 28.

With reference to FIGS. 2 and 4, the portion or region of the outer surface 32 of the first layer 26 between the vertex 25 and the end 44 of the layer 26, and the portion or region of the outer surface 32 of the first layer 26 between the vertex 25 and the end 50 of the first layer 30 define an angle Z centered around the vertex 25. With particular reference to FIG. 5, in one non-limiting embodiment of the invention, the angle Z is substantially equal to the angle subtended by edges 53 of packed glass sheets 54 and outermost surface 56 of outermost glass sheet 58 (outer most sheet designated by the numbers 56 and 58) of the packed sheets 54. In this manner, the vertex 25 engages corner 60 of the packed glass sheets 54 with the region of the first surface 32 of the first layer 26 between the vertex 25 and the end 44 of the first layer 26 engaging the underlying edges 53 of the packed glass sheets 54, and with the region of the first surface 32 of the first layer 26 between the vertex 25 and the end 48 of the first layer engaging the underlying outer surface 56 of the outermost glass sheet 58 of the packed sheets 54. Usually the angle Z is a 90-degree angle, i.e. a right angle, however non-limiting embodiments of the invention contemplate the angle Z to be more or less than a right angle.

The outer surface 40 of the second layer 28 of each of the legs 22 and 24 of the corner restraint 20 is contoured to provide a course or path for the banding strap 62 to bias the leg 22 or 24 engaged by the banding strap 62 (leg 24 shown engaged in FIG. 5) against the outermost sheet 58 of the packed glass sheets 54 to more evenly distribute the force applied by the banding strap 62 through the leg 22 and/or 24 of the corner restraint to the packed sheets 54, e.g. in FIG. 5 between the corner 60 of the packed sheets 54 and the outer surface 56 of the outermost glass sheet 58 engaged by the leg 24 of the corner restraint. More particularly and with reference to FIGS. 1-5, the outer surface 40 of the second layer 28 has a pair of spaced sidewalls 63, 64 adjacent the end 50 of the second layer 28, a pair of spaced sidewalls 65, 66 adjacent the end 46 of the second layer 28, and a pair of spaced sidewalls 67, 68 extending from the sidewalls 63, 64 over the vertex 25 to the sidewalls 65, 66 to provide a groove 72 (clearly shown in FIGS. 1 and 3) having a base 73 (the base 73 clearly shown in FIGS. 1 and 4). The base 73 of the groove 72 is contoured to have a curved raised portion 74 between the spaced sidewalls 63, 64 and the spaced sidewalls 65, 66 starting at, or at a position spaced from, the end 50 and 46, respectively, of the second layer 28 and terminating a predetermined distance from their respective end 50 or 46. The base 73 of the groove 72 extends from the raised portion 74 between the sidewalls 63, 64 over the vertex 25 to the raised portion 74 between the sidewalls 65, 66.

In one non-limiting embodiment of the invention, the radius of the raised portions 74 of the groove 72 between the sidewalls 63, 64 and 65, 66 is less than the radius of the groove at the vertex 25. Further, the distance between the raised portion 74 between the sidewalls 63, 64 and the sidewalls 65, 66, and the inner surface 38 of the outer layer 28 is greater than the distance between the base 73 of the groove 72 and the inner surface 38 of the outer layer 28 at the vertex 25. In one non-limiting embodiment of a restraint 20 configured in a manner similar to that shown in FIGS. 1-4, the linear distance between the raised portion 74 and the pin 94 at vertex 25 was 4 inches (12.16 cm), the distance between the raised portion 74 and portion of the inner surface 38 of the outer layer 28 directly under raised portion 74 was 1 inch (2.54 cm), the distance between the base 73 of the groove 72 at the vertex 25 and the inner surface 38 of the outer layer 28 at vertex 25 was 0.5 inch (1.27 cm), and the linear distance between the raised portion 74 of the groove and adjacent end 46 or 50 of the second layer 28 was 1 inch (2.54 cm). As is appreciated the invention is not limited to having the raised portion 74 of the groove 72 between the sidewalls 65, 66 and the raised portion 74 between the sidewalls 67, 68 equidistant from the vertex 25.

In the above non-limiting embodiments of the invention, the groove 72 prevents the transportation forces from causing the corner restraint to slip from under the banding strap 62 (see FIG. 5). To maintain the banding strap 62 in the groove 72 for ease of applying the corner restraint to the packed sheets 54 and not limiting to the invention, an elongated member or pin 94 is secured between the sidewalls 66, 68 at the vertex 25 (clearly shown in FIGS. 1 and 4).

Figure 6:
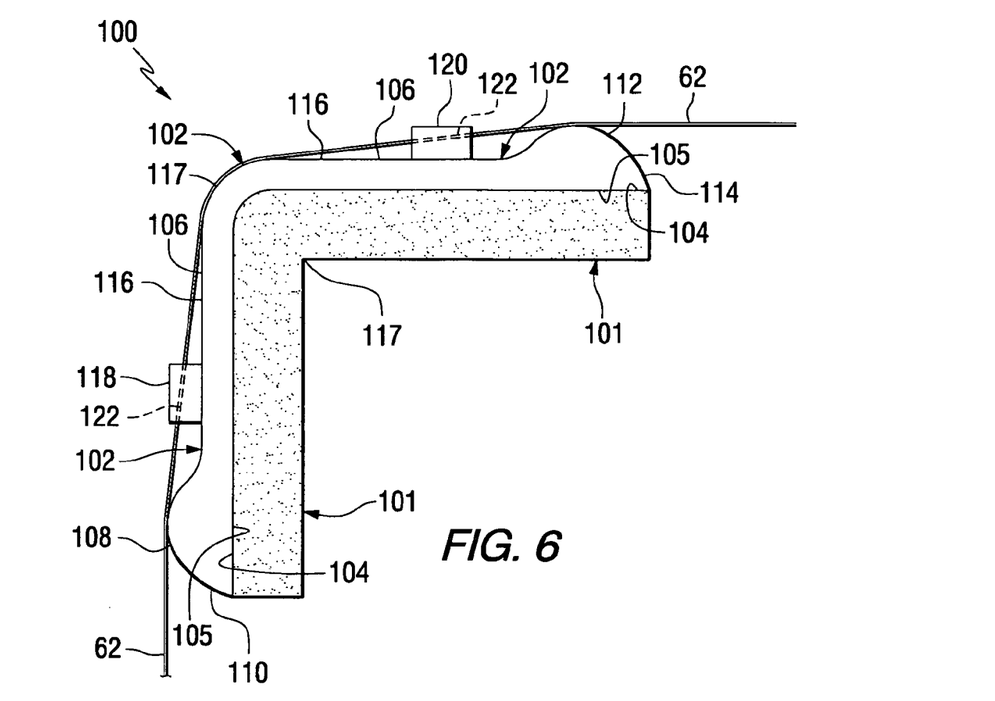
FIG. 6 is a view similar to view of FIG. 2 of another non-limiting embodiment of a corner restraint of the invention having a banding strap attached thereto.

With reference to FIG. 6, there is shown another non-limiting embodiment of a corner restraint of the invention designed by the number 100. The corner restraint 100 includes a first or inner layer 101 and a second or outer layer 102. The first layer 101 has a first or inner surface 104 in facing relationship to inner surface 105 of the second layer 102. Outer or second surface 106 of the second layer 102 has a raised curved portion 108 at end portion 110, and a curved raised portion 112 at end portion 114, of the second layer 102. Portion 116 of the surface 106 between the raised portions 108 and 112, and the vertex 117 is relatively flat. The banding 62 is maintained on the corner restraint 100 by attachment member 118 securely mounted on the surface 106 of the second layer 102 adjacent the end portion 110 and/or by an attachment member 120 securely mounted on the surface 106 adjacent the end portion 114. The attachment members 118 and 120 each have a longitudinal slot 122 through which the banding strap passes. The slot 122 is dimensioned such that the banding strap 62 passes from the adjacent one of the curved raised portion 108 or 112 through the slot 122 of the attachment 118 or 120 over the vertex 117 without contacting inner walls of the slot 122 of the attachments 118 and 120 when the corner restraint 100 is secured to a corner of the packed sheets 54.

Figure 7:
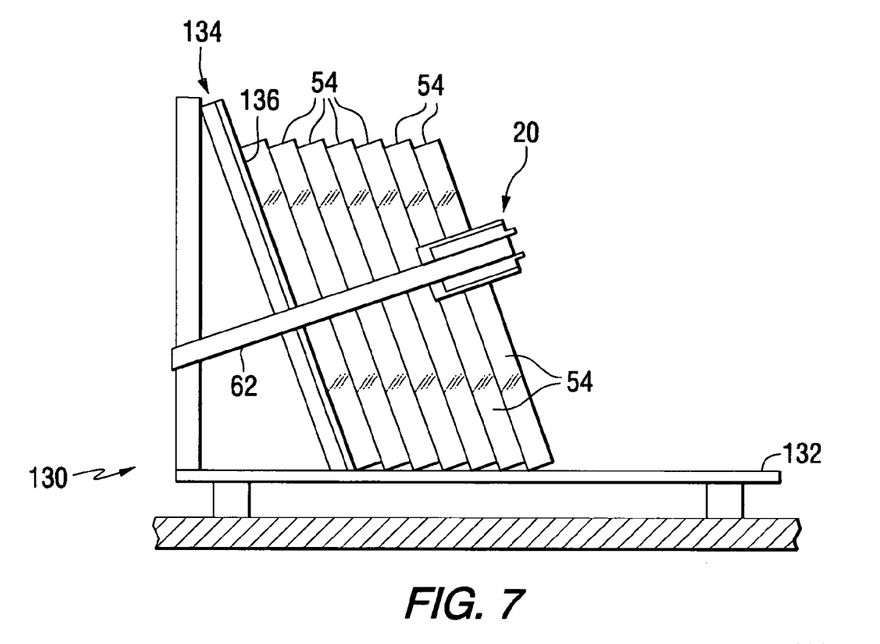
FIG. 7 is a side elevated view of packed glass sheets secured in a shipping/storage rack utilizing a non-limiting embodiment of corner restraints of the invention and a banding strap to unitize the packed glass sheets.
Figure 8:
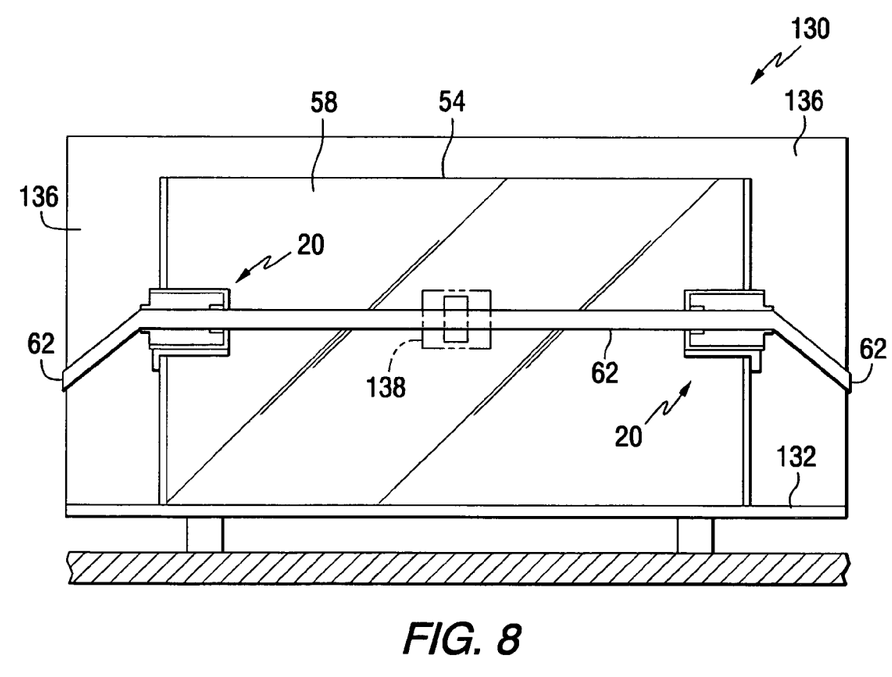
FIG. 8 is a front elevated view of the loaded shipping/storage rack of FIG. 7.

With reference to FIGS. 7 and 8, and not limiting to the invention, there is shown a shipping/storage rack 130 of the type used in the art that can be used in the practice of the invention. The shipping rack 130 includes a base 132 and a backwall 134 secured to the base 132. The backwall has a sloping surface 136 to support the glass sheets 54 in an almost vertical position, e.g. about 5 degrees from the vertical. The base 132 has a width and length greater than the width and length of the packed sheets 54 on the rack 130 to prevent the packed sheets 54 from being contacted and damaged by equipment used during the loading, unloading, moving and/or storage of the racks. The backwall 134 has a height greater than the height of the stacked sheets 54 to optionally provide for stacking the loaded racks on top of one another. As can be appreciated by those skilled in the art, a pad or cushion (not shown) can be placed over the sloping surface 136 of the backwall 134 and on supporting surface of the base 132 to provide a non-abrasive surface to protect the surface and edges of the glass sheets from surface damage.

In one non-limiting embodiment of the invention, the banding strap 62 shown in FIGS. 5, 7 and 8 has its course from around the left side of the backwall 134 (see FIG. 8), along the left side of the loaded sheets (see FIG. 7), toward the left corner restraint 20, in the groove 72 of the corner restraint, under the elongated member 94 (see FIG. 5), across the outermost sheet 58, in the groove 72 and under the elongated member 94 of the right corner restraint (see FIGS. 5 and 8), out of the groove 72 of the right corner restraint 20, along the right side of the packed sheets 54, around the right side of the backwall 134 with the ends of the banding strap 62 joined together, e.g. but not limiting to the invention behind the backwall. Optionally a flat pad 138 shown in phantom in FIG. 8 can be secured under the banding strip 62 between the right and left corner restraints 20. One or more banding straps and corner restraints of the invention or lash bars of the type used in the art (not shown in FIGS. 7 and 8 for purposes of clarity) can be provided around the top and the bottom of the packed glass sheets 54.

The discussion is now directed to the features of the corner restraint 20 of the invention that provides for the distribution of the forces applied by the banding strap over a greater surface area, maintains the corner restraint against the outer surface of the outermost sheet 58 of the packed sheets and reduces the probability of breakage of the sheets at the corner of the packed sheets 54 engaged by the corner restraint.

Figure 9:
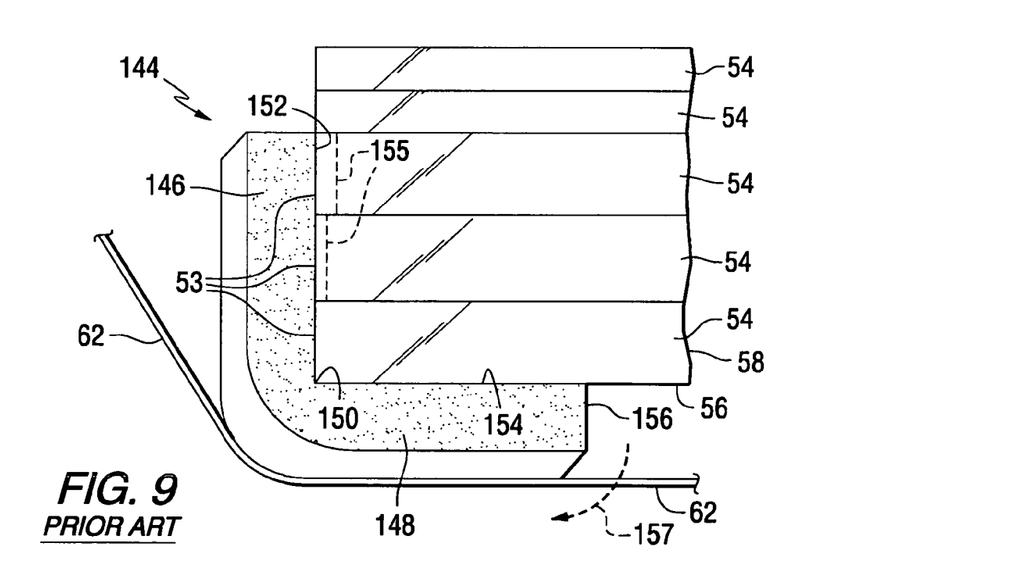
FIG. 9 is a view similar to the view of FIG. 5 showing a prior art corner restraint.

With reference to FIG. 9, there is shown a prior art corner restraint 144 having a first member 146 joined to a second member 148 at a vertex 150 to provide the corner restraint 144 with a generally L-shape cross sectional configuration. Surface 152 of the member 146 of the corner restraint 144 as shown in FIG. 9 is biased against the edges 53 of the sheets 54, and surface 154 of the member 148 is biased against underlying portion of the outer surface 56 of the outermost glass sheet 58, by the banding strap 62. The banding strap 62 applies compression forces to the glass sheets 54 through the corner restraint 144. The corner restraint 144 provides for the banding strap to bend around a small area of the corner restraint 144, more particularly, around the vertex 150, to apply all or a majority of the force of the banding strap in one concentrated area, namely the corner of the packed sheets, which area is susceptible to breakage. Another limitation of the prior art corner restraints is the less than full surface contact between the surface 154 of the corner restraint 144 and the underlying surface of the outermost glass sheet when the edges of the packed glass sheets are not aligned, as shown in phantom in FIG. 9 for edges 155 of the packed glass sheets 54. More particularly, when the edges of the packed glass sheets are not aligned as shown for the edges 155 in FIG. 9, the banding strap 62 around the vertex 150 applies forces to the vertex 150 of the corner restraint 144 to pivot the corner restraint 144, e.g. to move end 156 of the member 148 of the corner restraint 144 in the direction of the arrow 157, placing the corners of the packed glass sheets under compression force caused by the pivoting of the corner restraint, and moving portions of the surface 154 of the corner restraint 144 away from the packed sheets.

With reference to FIG. 5, the corner restraint 20, a non-limiting embodiment of the corner restraints of the invention, has the banding strap 62 passing over one of the raised portion 74, e.g. and not limiting to the invention raised portion 74 between the sidewalls 63, 64 (see also FIG. 4), and the base 73 of the groove 72 at the vertex 25, to apply the tensioning forces of the banding strap 62 to the portions of the glass sheet underlying the raised portion 74 of the groove 72 between the sidewalls 63, 64. With this arrangement, the surface 32 of the leg 24 of the corner restraint 20 as shown in FIG. 5 is biased against the surface 56 of the outermost sheet 58 to eliminate pivoting of the vertex 25 of the corner restraint about the corner 60 of the packed glass sheets 54. In addition and as is appreciated by those skilled in the art, this arrangement provides for a more uniform distribution of the tensioning forces of the banding strap 62 across the surface portion of the outermost sheet underlying the leg of the corner restraint 20 of the invention.

The tensioning forces applied to the prior art corner restraint 144 and to the corner restraint of the invention, e.g. and not limiting to the invention the corner restraint 20 shown in FIG. 5 are equal; however, as can now be appreciated, the tensioning forces applied by the banding strap 62 to the prior art corner restraint 144 are concentrated at the vertex 150 and the underlying corner of the packed glass sheets whereas the tensioning forces applied by the banding strap 62 to the corner restraint 20 of the invention is distributed to the portion of the glass under the raised portion 74 of the groove 72, and the vertex 25; of the corner restraint. More particularly, the corner restraint of the invention provides the corner restraint with a wedge feature to distribute the tensioning forces of the banding strap 62, which result in compression forces on the glass, over a greater surface area and reduces the probability of the outermost sheet 58 (see, FIG. 5) breaking due to concentrated force from the banding strap.

Although not limiting to the invention, the parameters to be considered include (1) the material of the first layer 26 and of the second layer 28; (2) the tension force applied by the banding strap 62; (3) the actual distance between the raised portion 74 of the groove 72 between the sidewalls 63, 64 and the base 73 of the groove 72 at the vertex 25, contacted by the banding strap 62; (4) the radius of the raised portion 74 of the groove 72 between the sidewalls 63, 64 and the radius of the base 73 of the groove 72 at the vertex 25, and (5) the difference between the height of the raised portions 74 between the sidewalls 63, 64 and the height of the base 73 of the groove 72 at the vertex 25, contacted by the banding strap. In the following discussion parameter (1) the material of the first layer 26 and of the second layer 28, and parameter (2) the tension force applied by the banding strap 62 are considered to be constant. Maintaining parameters (4) and (5) constant, increasing the distance between the raised portion 74 of the groove 72 between the sidewalls 63, 64, and the base 73 of the groove 72 at the vertex 25, contacted by the banding strap 62 distributes the force over a greater area of the outer surface of the outermost sheet 58 and visa versa. Maintaining parameters (3) and (5) constant, increasing the difference between the radius of the raised portions 74 of the groove 72 between the sidewalls 63, 64 and the radius of the base 73 of the groove 72 at the vertex 25, increases the force applied by the raised portion 74 between the sidewalls 63,64 to the underlying portion of the glass sheets and visa versa. Maintaining the parameters (3) and (4) constant, increasing the difference between the height of the raised portion 74 of the groove 72 between the sidewalls 63, 64, and the height of the base 73 of the groove at the vertex 25 contacted by the banding strap 62, increases the force applied by the raised portion 74 of the groove 72 between the sidewalls 63, 64 to the underlying portion of the outermost glass sheet 58 and decreases the force applied to the corner of the packed glass sheets 54. As can now be appreciated, by selecting dimensions for the above-discussed parameters in accordance to the invention, a more even distribution of forces can be applied to the outer glass sheet of packed glass sheets while maintaining one of the legs of the corner restraint against the underlying surface of the outermost glass sheet 58 of the packed glass sheets.

As can now be appreciated, in the situation when the path or course of the branding strap 62 is only over raised portion 74 of the groove 72 and the vertex 25, e.g. as shown in FIG. 5, the invention contemplates only one leg of the corner restraint having a raised portion. In the situation when the banding strap 62 has it path over both legs of the corner restraint as shown in FIG. 6, the invention contemplates a raised portion at both ends of the corner restraint or only at the end of the corner restraint contacting the outer surface 56 of the outermost sheet 58 of the packed glass sheets 54. In the practice of the invention, although not limiting thereto, it is recommended that both ends of the corner restraint have a raised portion to eliminate the need to orient the corner restraint before positioning it on the stacked glass sheets. Further, the elongated member or pin 94 (see FIG. 3) and the attachments 118 and 120 (see FIG. 6) were discussed to maintain the corner restraint on the banding strap 62; the invention, however, is not limited thereto and any type of arrangement can be used to maintain the corner restraint on the banding strap or the banding strap on the corner restraint.

Although not limiting to the invention, the second layer 28 has hardness greater than that of the first layer 26. As used herein, the term "hardness" refers to the ability of a material to resist penetration or abrasion. Non-limiting examples of suitable materials for the second layer 28 include, but are not limited to, metal, wood, polymeric materials, or mixtures or laminates thereof. In one non-limiting embodiment, the second layer 28 is polyurethane. When the material of the second layer 28 is a foamed polymeric material, the foamed polymeric material of the second layer 28 preferably has a density greater than the density of the material of the first layer 26. The second layer 28 should be sufficiently abrasion-resistant to protect the first layer 26 from damage or abrasion during shipping and/or storage and to withstand contact by a fastening member, such as the banding strap 62, without the banding strap cutting through or severely damaging the second layer 28. As shown in the figures, e.g. FIG. 1, the second layer 28 can be substantially continuous from the end 46 to the end 50 and preferably has a curved surface at the vertex 25 rather than an apex to minimize damage to the banding strap and distribute the forces of the banding strap as discussed above.

In one non-limiting embodiment of the invention, the first layer 26 is made at least partly of a flexible material, e.g., a material that absorbs shock, is compressible, and is resilient, i.e., returns substantially to its original shape and size after being compressed. Examples of materials suitable for the first layer 26 include, but are not limited to, natural or synthetic elastic, elastomeric, or flexible materials, such as cork, rubber, or polymeric-materials; such as but not limited to natural or synthetic polymers, thermoplastic materials, or thermoset materials. Suitable polymeric materials include ABS—(acrylonitrile-butadiene-styrene), phenolic, epoxy, polyamides, polybutene, polybutadiene, polycarbonate, neoprene, polyisoprene, polyvinyl chloride, polystyrene, polypropylene, polyurethane, polyesters, polyalkanes, polyalkenes, and polyethylene, e.g., foamed polyethylene, or mixtures or laminates thereof. All the polymeric materials can be provided with or without different additives, such as but not limited to antioxidants, UV stabilizers, pigments, cross-linked agents and fillers. Although not liming to the invention, the first layer 26 preferably has a thickness sufficient to absorb shock or transportation forces during the shipment and handling of the rack having the articles thereon without the edges or corners of the articles on the rack rubbing or cutting through the first layer 26. In a non-limiting embodiment of the invention, the first layer 26 is formed by foamed polyethylene having a density of 3 to 9 pounds per cubic foot (0.29 to 0.86 grams per cubic centimeter), e.g., 6 pounds per cubic foot (0.58 grams per cubic centimeter). In another non-limiting embodiment of the invention, the second layer 28 is formed by foamed polyurethane having a density of 20 to 40 pounds per cubic foot (1.92 to 3.84 grams per cubic centimeter), e.g., 32 pounds (3.07 grams per cubic centimeter). As a general rule, as the density of the material (e.g., polyethylene) forming the first layer 26 increases, the overall thickness of the first layer 26 can be decreased. However, the density of the polyethylene preferably is not below a density at which the polyethylene has insufficient shock absorbing qualities for the articles being secured on the shipping rack. For example, the density of the polyethylene can generally be lower for metal articles than for frangible articles, such as glass sheets.

Figure 1:
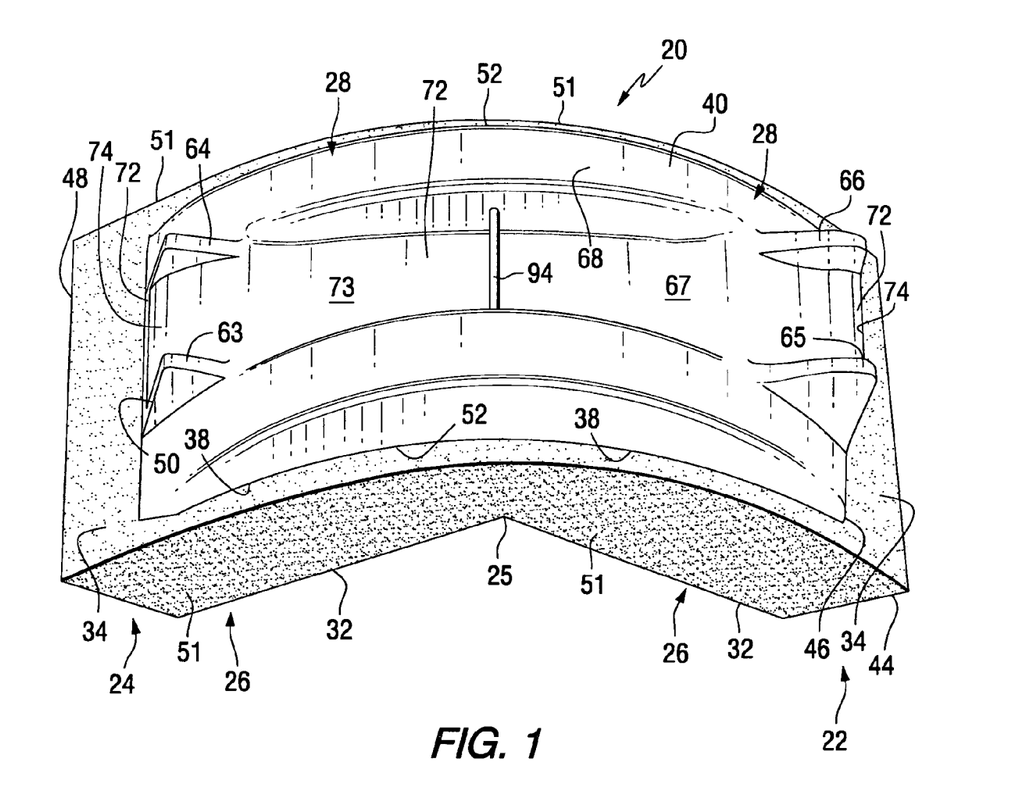
FIG. 1 is an isometric front view of a non-limiting embodiment of a corner restraint of the invention.

In the instance where the vertex 25 of the corner restraint 20 provides for the inner surface 38 of the second layer 28 to be curved as showing in FIGS. 1, 2 and 4, the distance between the first and second surfaces of the first layer 26 at the vertex 25 should be sufficient to reduce the possibilities of the corners of the sheets cutting through the first layer 26 at the vertex 25. In one non-limiting embodiment of the invention, the first layer 26 had a minimum thickness at the vertex 25 of 0.25 to 1 inch (0.64 to 2.54 cm), e.g., 0.5 inch (1.27 cm). As can be appreciated the second surface 34 of the first layer 26 does not have to be curved and can be square.

In another non-limiting embodiment of the invention and with reference to FIGS. 2 and 3 as needed, the first leg 22 and the second leg 24 each have a length of 3 inches to 10 inches (7.62 cm to 25.4 cm), e.g., 5 inches (12.7 cm), and a thickness between the first surface 32 and the second surface 34 of the inner layer 30 (e.g., polyethylene) of 0.25 inch to 3 inches (0.64 cm to 7.62 cm), e.g., 1.25 inches (3.18 cm). In another non-limiting embodiment of the invention, the first surface 32 of the first layer 26 had a distance from the vortex 25 to the ends 44 and 48 of the first layer 26 of 4⅝ inch (11.75 cm), a distance between the sides 51 of the first layer 26 of 4 inches (10.16 cm) and a thickness at the ends 44 and 48 of 1.5 inches (3.81 cm). The ends 46 and 50 of the second layer 28 were spaced 1.25 inches (3.18 cm) from the ends 44 and 48, respectively of the first layer 26, and the sides 52 of the second layer 28 were spaced 0.25 inch (0.64 cm) from the sides 51 of the first layer 26.

As will be appreciated by one of ordinary skill in the art, the non-limiting embodiments of the restraint of the invention described above can be formed in many ways and the invention is not limited to the manner in which the restraint of the invention is formed. Without limiting the present invention, the first and second layers can be molded or extruded. Furthermore, the first layer 26 and second layer 28 can be separately formed and then laminated together, such as through a conventional adhesive (glue) or by mechanical fastening arrangements including but not limited to Velcro, or mechanical fasteners, e.g. but limited to clamps, pegs, or screws extending into or through the layers 26, 28. Alternatively, the restraint of the invention can be formed by a conventional molding process in which the polymeric, e.g., polyethylene, material of the inner layer 26 is contacted with the polymeric, e.g., polyurethane, material of the outer layer 28 when the polyurethane material is warm, e.g., greater than or equal to about 68° F. (20° C.), to adhere or mold the two materials together to form the restraint 20. Alternatively, the materials of the layers 26 and 28 can be the same material, e.g., polyethylene, with the inner layer 26 having the same or a lower density than the outer layer 28.

The elongated member 94 at the vertex 25 to retain the banding strap 62 can be mounted in the sidewalls 67, 68 at the time the second layer 36 is formed or can be force through the sidewalls over the base 73 of the groove 72 after the second layer 28 is formed.

In one non-liming embodiment of the invention, the outer layer 28 was made of polyurethane. The sidewalls 66, 67 had a thickness of 0.5 inch (1.27 cm). The groove 72 between the sidewalls 66,67 had a width of a 1.5 inches (3.81 cm) and a depth at the vertex 25 of 0.75 inch (1.91 cm) and was flush with the sidewalls 66, 67 at the beginning of the sidewalls 63, 64 and 65, 66. The spaced walls 62, 63 and 64, 65 had a height of 1.5 inches (3.81 cm) measured from the first surface 38 of the second layer 28, and a thickness of 0.25 inch (0.64 cm). The portion of the groove 72 between the sidewalls 62, 63 and 64, 65 had a width of 1.25 inches (3.18 cm) and a depth at the raised portion 74 of the groove 72 of ⅜ inches (0.95 cm).

Figure 10:
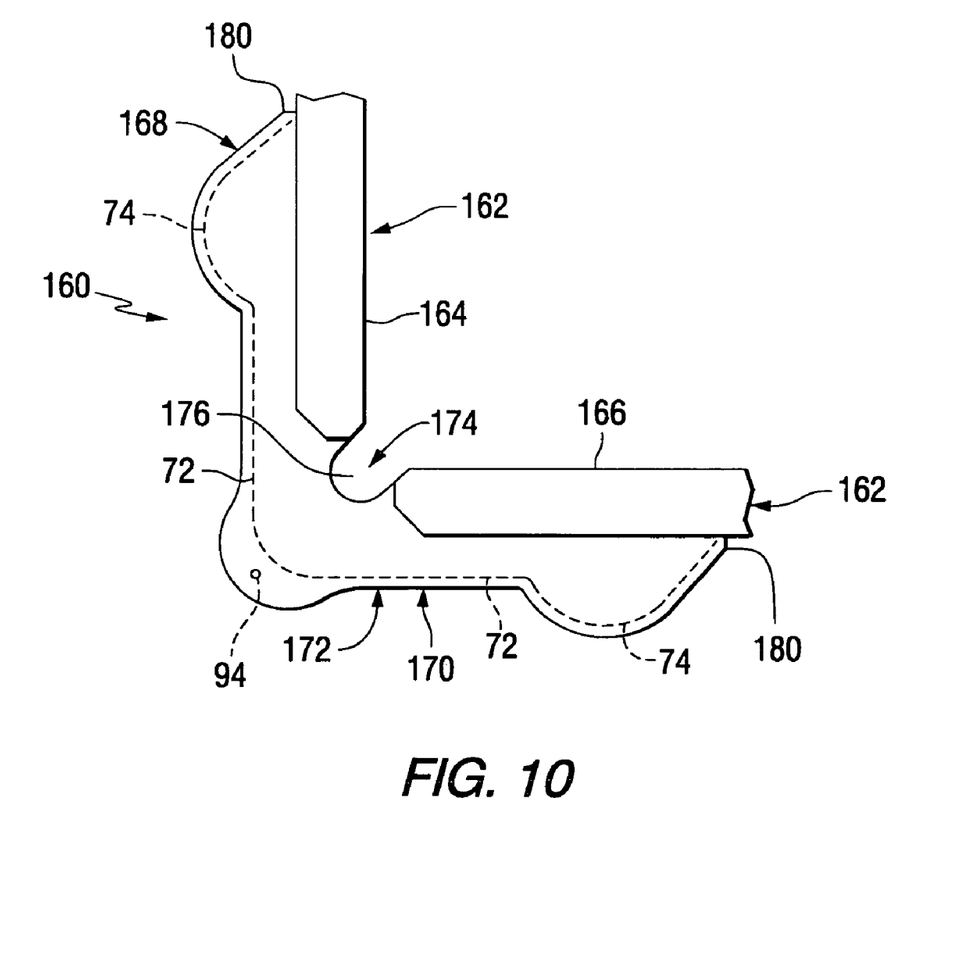
FIG. 10 is a view similar to view of FIG. 2 showing another non-limiting embodiment of a corner restraint of the invention.

Shown in FIG. 10 is another non-limiting embodiment of a corner restraint of the invention designated by the number 160. The restraint 160 is similar to the restraint 20 described above and shown in FIGS. 1-4 but, in this non-limiting embodiment of the invention, the inner or first layer 162 is divided into two separate or distinct regions 164 and 166, with one region located on each leg 168 and 170 of second or outer layer 172. A groove 174 is formed at the vertex 176 of the restraint 160 between the regions 164 and 166 as shown in FIG. 10. In FIG. 10 the raised portions 74 start at a position spaced from end 180 of the second layer 172.

As can now be appreciated the corner restraints of the invention can be utilized with any type of restraining system using banding straps to secured articles, e.g. but not limiting thereto, glass sheets loaded in any type of container.

In addition to reducing the forces applied by the banding straps to the corners of the packed glass sheets, the present invention also provides a corner that decreases the overall weight of the loaded container compared to utilizing conventional lash boards while maintaining the articles securely in place. Further, the restraints of the invention can be stored or returned to the shipper.

It will be readily appreciated by those skilled in the art that modifications cam be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A restraint, comprising:
   a substantially L-shaped body comprising:
   a first end and an opposite second end;
   a compressible, resilient first surface;
   an abrasion-resistant opposite second surface, the second surface having a predetermined path extending from the first end of the L-shaped body, over a corner of the L-shaped body to the second end of the L-shaped body, a first strap engaging position on the predetermined path spaced a first predetermined distance from the first end of the L-shaped body and a second strap engaging position on the predetermined path spaced a second predetermined distance from the first end of the L-shaped body, wherein the first predetermined distance is less than the second predetermined distance, and
   the first strap engaging position having a height greater than height of the second strap engaging position, wherein the height of the first and second strap engaging positions are each measured relative to an imaginary straight line between the first and second strap engaging positions, wherein the imaginary line extends in a direction away from the second surface of the L-shaped body and extends above the first and second strap engaging positions.

2. A restraint, comprising:
   a body having a first surface and an opposite second surface, the second surface having a first strap engaging position spaced a first predetermined distance from one end of the body and a second strap engaging position spaced a second predetermined distance from the one end of the body;
   wherein:
   the first predetermined distance is less than the second predetermined distance, and the first strap engaging position has a height measured from a portion of the second surface between the first and second engaging positions, defined as an intermediate position, greater than a height of the second engaging position measured from the second surface at the intermediate position;
   the first surface is a compressible, resilient surface, and the opposite second surface is an abrasion-resistant surface, and
   the second surface further comprises a groove extending from the one end of the body toward an opposing end of the body, wherein the first and second strap engaging positions and the intermediate position are in the groove.

3. The restraint according to claim 2, wherein the body is a substantially L-shaped body comprising a first leg and a second leg defining a vertex, and wherein the one end of the body is an end of the first leg spaced from the vertex and the second strap engaging position is at the vertex.

4. The restraint according to claim 3, wherein the second leg comprises the first surface and the second surface with the second surface of the second leg having a third strap engaging position spaced from the vertex, the third strap engaging position has a height measured from a portion of the second surface of the second leg between the third engaging position and the vertex, defined as a second intermediate position, greater than a height of the vertex measured from the second intermediate position.

5. The restraint according to claim 3, wherein the body has a first layer and a second layer, and the first and second layers are laminated together.

6. The restraint according to claim 5, wherein the second layer has a hardness greater than that of the first layer and at least one of the layers is selected from the group of cork, rubber and foamed and non-foamed polymeric materials.

7. A restraint, comprising:
   a body having a first surface and an opposite second surface, the second surface having a first strap engaging position spaced a first predetermined distance from one end of the body and a second strap engaging position spaced a second predetermined distance from the one end of the body;
   wherein the first predetermined distance is less than the second predetermined distance, and the first strap engaging position has a height measured from a portion of the second surface between the first and second engaging positions, defined as an intermediate position, greater than a height of the second engaging position measured from the second surface at the intermediate position, and
   wherein the second surface further comprises a groove extending from the one end of the body toward an opposing end of the body, wherein the first and second strap engaging positions and the intermediate position are in the groove.

8. The restraint according to claim 7, wherein the body is a substantially L-shaped body comprising a first leg and a second leg defining a vertex, and wherein the one end of the body is an end of the first leg spaced from the vertex and the second strap engaging position is at the vertex.

9. The restraint according to claim 8, wherein the second leg comprises the first surface and the second surface with the second surface of the second leg having a third strap engaging position spaced from the vertex, the third strap engaging position has a height measured from a portion of the second surface of the second leg between the third engaging position and the vertex, defined as a second intermediate position, greater than the height of the vertex measured from the second intermediate position.

10. The restraint according to claim 9, wherein the body has an first layer and a second layer, wherein the first and second layers are laminated together.

11. The restraint according to claim 10, wherein a strap retaining arrangement is on the second layer.

12. The restraint according to claim 10, wherein the second layer has a hardness greater than that of the first layer.

13. The restraint according to claim 10, wherein the vertex comprises a groove in the first layer.

14. The restraint according to claim 1, wherein a first leg and a second leg of the L-shaped body defines the corner, and wherein the first end of the body is an end of the first leg spaced from the corner and the second strap engaging position is at the corner.

15. A restraint, comprising:
   a substantially L-shaped body comprising:
      a first leg and a second leg with the first leg having a first end of the L-shaped body and the second leg having an opposite second end of the L-shaped body;
      a first surface;
      an opposite second surface, the second surface having a predetermined path extending from the first end of the L-shaped body, over a corner of the L-shaped body to the second end of the L-shaped body, wherein the first leg of the L-shaped body has a first section of the predetermined path and the second leg of the L-shaped body has a second section of the predetermined path, a first strap engaging position on the first section of the predetermined path, the first strap engaging position spaced a first predetermined distance from the first end of the L-shaped body; a second strap engaging position on the predetermined path, the second strap engaging position at the corner of the L-shaped body, and a third strap engaging position along the second section of the predetermined path spaced from the corner of the L-shaped body, and
      the first strap engaging position having a height greater than height of the second strap engaging position, wherein the height of the first and the second engaging positions are each measured relative to a first imaginary straight line between the first and second engaging positions, wherein the first imaginary line extends in a direction away from the first section of the predetermined path and extends above the first and second strap engaging positions, and the third strap engaging position having a height greater than the height of the second strap engaging position, wherein the height of the second and third strap engaging positions are each measured relative to a second imaginary straight line between the second and the third engaging positions along the second section of the predetermined path wherein the second imaginary line extends in a direction away from the second section of the predetermined path and extends above the second and third strap engaging positions.

16. The restraint according to claim 15, wherein the L-shaped body further comprises a first layer and a second layer laminated together, wherein an outer surface of the second layer is the second surface of the L-shaped body.

17. The restraint according to claim 16 wherein the L-shaped body further comprises a strap retaining arrangement overlaying a portion of the predetermined path.

18. The restraint according to claim 16, for securing stacked sheets on a rack wherein the restraint is positioned at a corner of the stacked sheets with the first surface of the L-shaped body of the restraint in contact with the stacked sheets and a banding strap passing over at least two of the first, second and third strap engaging positions of the restraint to bias the at least two of the first, second and third strap engaging positions and the sheets toward a backwall of the rack.

19. A restraint, comprising:
   a substantially L-shaped body comprising:
      a first surface and an opposite second surfacer;
      a first strap engaging position on the second surface and spaced a first predetermined distance from one end of the L-shaped body; and
      a second strap engaging position on the second surface at a corner of the L-shaped body, wherein a first portion of the first surface opposite to the first strap engaging position and a second portion of the first surface opposite to the second strap engaging positions each have a compressible, resilient surface;

wherein a thickness of the first strap engaging position measured between the first portion of the first surface and the second surface of the L-shaped body at the first strap engaging position is greater than a thickness of the second strap engaging position measured between the second portion of the first surface and the second surface of the L-shaped body at the second strap engaging position such that a force applied by a banding strap to the second surface of the restraint when the banding strap engages the first and second strap engaging positions is greater along the first portion of the first surface beneath the first strap engaging position than along the second portion of the first surface beneath the second strap engaging position.

20. The restraint according to claim 19, wherein the opposite second surface of the L-shaped body is an abrasion-resistant surface and the substantially L-shaped body comprising a first leg and a second leg, and wherein the one end of the L-shaped body is an end of the first leg spaced from the corner of the L-shaped body.

21. The restraint according to claim 15 wherein at least one of the first or second strap engaging positions includes a pair of spaced upright sidewalls to provide a groove wherein a base of the groove is the at least one of the first or second strap engaging positions.

22. The restraint according to claim 1 wherein the second strap engaging position is at the corner of the L-shaped body.

23. The restraint according to claim 20 wherein the first leg of the L-shaped body has a first pad of a compressible, resilient material, and the second leg of the L-shaped body has a second pad of a compressible, resilient material, and the first and second portions of the first surface opposite to the first and the second strap engaging positions, respectively are each a compressible, resilient surface.

24. The restraint according to claim 23 wherein the corner of the L-shaped body has a cut out extending from the first surface toward and terminating short of the second surface of the L-shaped body.

25. A restraint, comprising:
a substantially L-shaped body comprising:
  a first end and an opposite second end;
  a compressible, resilient first surface, the first surface extending from the first end of the L-shaped body to corner of the L-shaped body, and from the corner of the L-shaped body to the second end of the L-shaped body;
  an abrasion-resistant opposite second surface, the second surface having a predetermined path extending from the first end of the L-shaped body, over a corner of the L-shaped body to the second end of the L-shaped body, a first strap engaging position on the predetermined path spaced a first predetermined distance from the first end of the L-shaped body and a second strap engaging position on the predetermined path spaced a second predetermined distance from the first end of the L-shaped body, wherein the first predetermined distance is less than the second predetermined distance, the compressible, resilient first surface extends at least from a position opposite to the first strap engaging position to a position opposite to the second strap engaging position, and
the first strap engaging position having a thickness greater than a thickness of the second strap engaging position, wherein the thickness of the first strap engaging position is measured between the first surface and the second surface of the L-shaped body at the first strap engaging position and the thickness of the second strap engaging position is measured between the first surface and the second surface of the L-shaped body at the second strap engaging position.

* * * * *